United States Patent [19]

Linnett et al.

[11] Patent Number: 5,301,326
[45] Date of Patent: Apr. 5, 1994

[54] METHOD AND SYSTEM FOR CONTROLLING THE EXECUTION OF AN APPLICATION PROGRAM

[75] Inventors: Barry J. Linnett, Seattle; Ford Martin, Edmonds, both of Wash.

[73] Assignee: Microsoft Corporation, Redmond, Wash.

[21] Appl. No.: 764,706

[22] Filed: Sep. 24, 1991

[51] Int. Cl.⁵ .............................................. G06F 9/45
[52] U.S. Cl. .................................. 395/700; 395/650; 395/375; 395/800; 364/DIG. 1; 364/239.4
[58] Field of Search ................. 395/650, 700, 800, 375

[56] References Cited

U.S. PATENT DOCUMENTS 4,787,026 11/1988 Barnes et al. ......................... 395/700
5,159,687 10/1992 Richburg ............................. 395/700
5,175,854 12/1992 Cheung et al. ....................... 395/650

Primary Examiner—Gareth D. Shaw
Assistant Examiner—A. Katbab
Attorney, Agent, or Firm—Seed and Berry

[57] ABSTRACT

A method and system for controlling the execution of an application program to effect the performing of a specialized task is provided. In preferred embodiments, an interface computer program gathers status information from the application computer program, collects user input relating to the specialized task, generates commands to send to the application program, and sends the commands to the application program to effect the execution of the specialized task. The interface computer program communicates with the application computer program preferably through the dynamic data exchange of Windows.

21 Claims, 13 Drawing Sheets

METHOD AND SYSTEM FOR CONTROLLING THE EXECUTION OF AN APPLICATION PROGRAM

TECHNICAL FIELD

This invention relates generally to methods for controlling the execution of an application program, and more specifically a method and system for providing a user interface for controlling the performing of specialized tasks by the application program.

BACKGROUND OF THE INVENTION

There currently exists a plethora of general-purpose application computer programs. These general-purpose application programs include word processors, desk top publishers, spreadsheets, and data base products. The field is very competitive for producing these products. When these general-purpose application programs were first developed for personal computers, they were unsophisticated by today's standards. Due in part to competitive pressures, these programs evolved into very sophisticated programs that provide many features and options. For example, the original spreadsheet products basically provide a grid of cells for numerical calculations. Spreadsheet products today provide many more capabilities such as graphing data, storing and retrieving data, and programming functions.

Unfortunately, as these general-purpose application programs get more sophisticated, the user also needs to be more sophisticated to take advantage of advanced features. These advanced features often make tasks that were previously simple more complicated to perform. Consequently, users must devote a considerable amount of time to learning the product to perform these previously simple tasks. This complexity also affects the efficiency of tasks that are performed for the first time on an infrequent basis. For example, a user may want to quickly produce a quarterly newsletter using a desktop publishing product, but the user may not have design skills or skills in using all the necessary parts of the application. Also, a user may produce a quarterly newsletter using a desktop publishing product. However, the user may forget how to use many of the features of the publisher in between issues of the newsletter. Thus, the user must spend a certain amount of re-learning time each quarter.

A feature that has recently been added to several general-purpose computer programs is interprocess communications. Interprocess communications allows computer programs to transmit data to each other through communications channels. Interprocess communications has typically been used to synchronize programs, to request data from a program, and send data to a program. Microsoft Corporation has developed a standard interprocess communications mechanism for application programs. The mechanism is called the Dynamic Data Exchange (DDE). The DDE provides a means for interprocess communications for programs that are developed for the Windows windowing environment. The DDE feature of Windows is described in the "Microsoft Systems Journal," November, 1987 and the "Microsoft Windows Programmer's Reference." The DDE is implemented through message passing. The DDE is typically used to allow two application programs to share data. For example, a user may want to incorporate a quarterly chart that is developed in a graphics package into a newsletter. Using DDE, the publisher product could request a new chart to be generated by the graphics product. The publisher product could then automatically incorporate the new chart into the current newsletter. The DDE thus provides a mechanism for one program to share and update data with another program.

Typically, developers of application programs that use the DDE will publish their DDE interface. For example, the developer of a spreadsheet product will publish a list of messages that it will recognize and how it will respond to those messages. Some general-purpose application programs define these messages so that each function that can be accomplished through the user interface to the application program can be accomplished through the DDE.

It would be desirable to have an easy-to-use method and system for using theses sophisticated general-purpose programs.

SUMMARY OF THE INVENTION

It is an object of the present invention to provide a method and system for performing a specialized task in a general-purpose application program.

It is another object of the present invention to provide a new user interface to a preexisting application program to control the execution of a task.

It is another object of the present invention to provide a method and system that allows third parties to extend and customize the features of an existing application program.

It is another object of the present invention to provide an interface program that has expert knowledge relating to the performance of a specialized task.

It is another object of the present invention to provide a system architecture for the performing of specialized task in an application program.

These and other objects, which will become apparent as the invention is more fully described below, are obtained by a method and system for controlling the execution of an application program to effect the performing of a specialized task. In preferred embodiments, an interface computer program gathers status information from the application computer program, collects user input relating to the specialized task, generates commands to send to the application program, and sends the commands to the application program to effect the execution of the specialized task.

DETAILED DESCRIPTION OF THE INVENTION

The present invention provides methods for implementing a user interface to one or more application programs. According to the methods, an interface program interacts with an application program and a user to effect the performance of a desired task. An interface program is referred to as a wizard. For example, in one embodiment of the present invention, several user interface programs, called PageWizards, provide new user interfaces to a desktop publishing application program, called Publisher. Each PageWizard provides a user interface to perform a specific task with the Publisher. One such PageWizard, called Calendar PageWizard, supports creating calendars. The Calendar PageWizard collects formatting and date information from the user. The Calendar PageWizard interacts with the Publisher to effect the creation of a calender by Publisher.

Figure 1A:
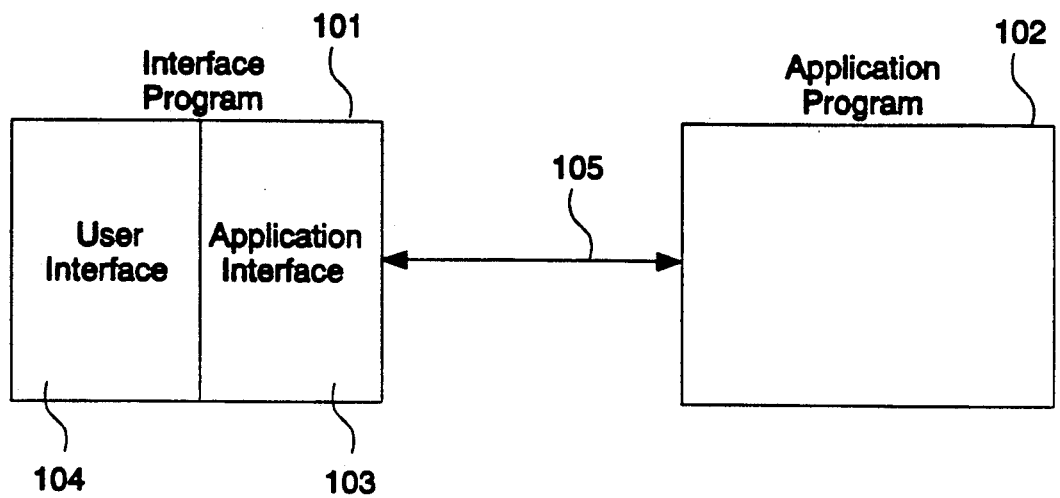
FIG. 1A is a block diagram of an application program and an interface program.
Figure 1B:
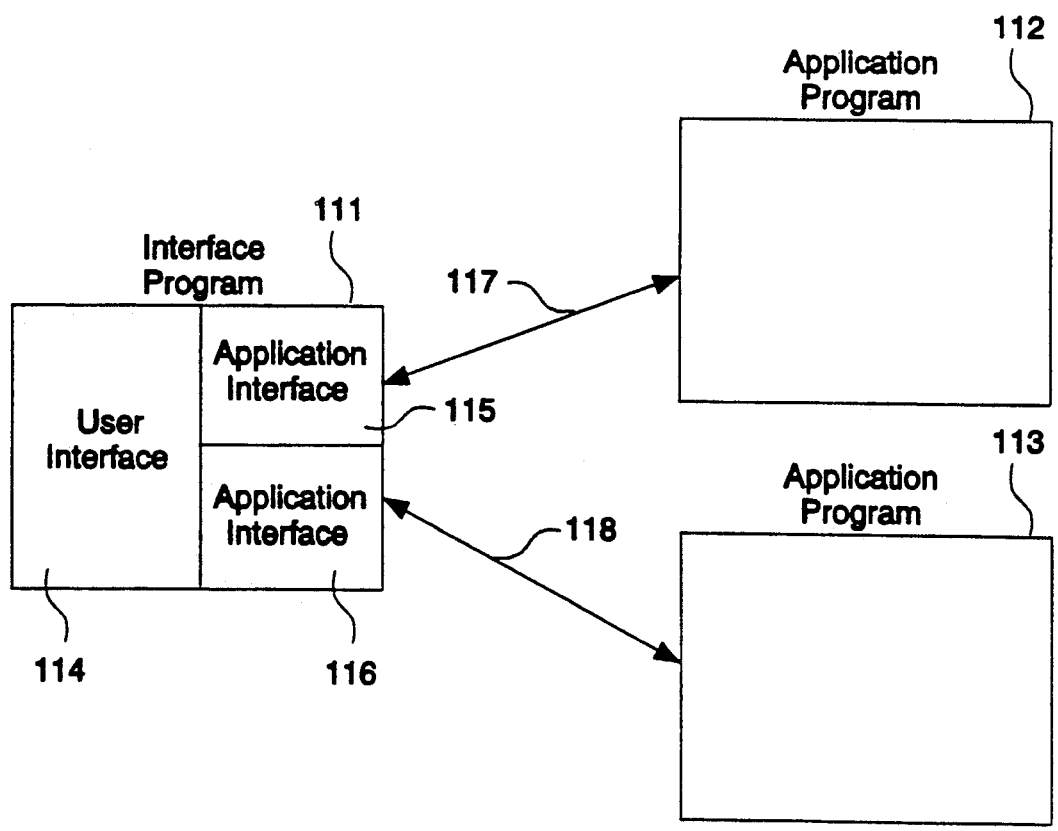
FIG. 1B illustrates a user interface program that interacts with two application programs.
Figure 2:
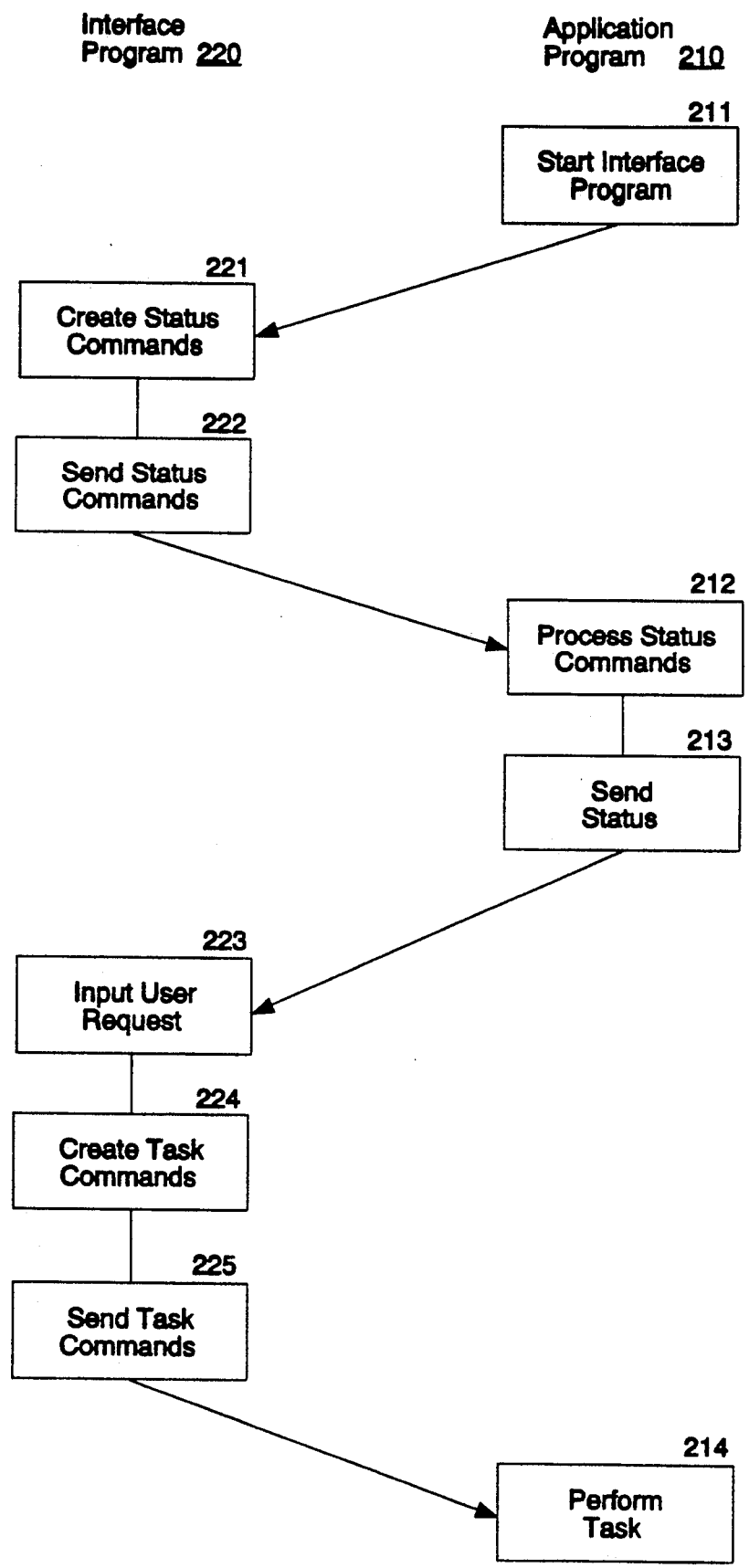
FIG. 2 is a flow diagram of typical communication sequence between an interface program and an application program.

FIG. 1A is a typical block diagram of an application program 102 and an interface program 101. The programs communicate through interprocess communications channel 105. In a preferred embodiment, interprocess communications channel is the Dynamic Data Exchange (DDE) of Windows. However, other methods of interprocess communications are acceptable. The interface program 101 comprises a user interface portion 104 and an application interface portion 103. The user interface portion 104 provides the user with a task-specific interface. In the example of Calendar PageWizard, the task is to use the Publisher to create calendars. The user interface displays calendar information to the user and collects formatting data from the user. The application interface portion 103 prepares commands to send to the application program 102 and controls communications with the application program 102. Alternatively, an interface program may interact with several application programs to effect a specific task. For example, a user interface program may support a mail merge. Such a user interface program could interact with a data base application program and a word processing application program. The mail merge interface program would collect names and addresses from the data base product based on user-entered criteria and send the data to a word processing program to merge with a user-entered document. FIG. 1B illustrates a user interface program that interacts with two application programs. The interface program 111 has a user interface portion 114 and two application interface portions 115, 116. Each application interface portion interfaces with one of the application programs 112, 113 through one of the interprocess communications channels FIG. 2 is a flow diagram of typical communication sequence between an interface program and an application program. The blocks in the right column 210 represent processing that is performed by the application program. The blocks in the left column 220 represent processing that is performed by the interface program. Initially, the application program is started. The user of the application program selects to start the interface program. In block 211, the application programs starts the selected interface program. In other embodiments, the user could start an interface program which would then start the application program or both the application program and the interface program could be started independently of each other. In block 221, the interface program creates status commands. These status commands request the application program to send status information to the interface program. In block 222, the interface program sends the status commands to the application program. In block 212, the application program processes the status commands. In block 213, the application program sends the status to the interface program. In block 223, the interface program inputs data from the user describing the task to be performed. In block 224, the interface program creates task commands to perform the desired task. In block 225, the interface program sends the task commands to the application program. In block 214, the application program executes the task commands.

Figure 3:
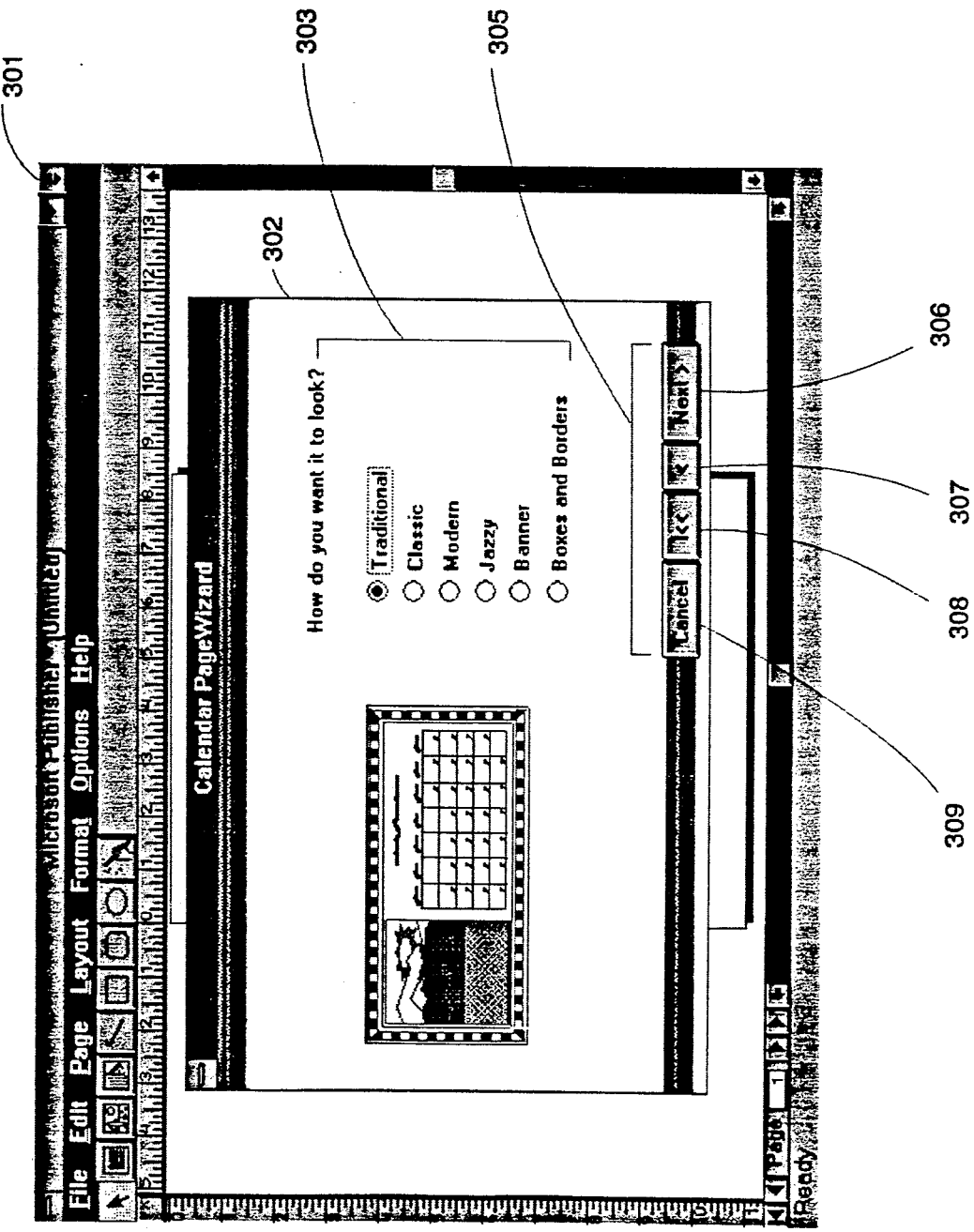
FIG. 3 shows a display for the Calendar PageWizard.

In a preferred embodiment, the application program and interface program operate in the Windows windowing environment. The interface program provides windows through which to display information to the user and receive information from the user. FIG. 3 shows a display for the Calendar PageWizard, which interfaces with the Publisher application program. PageWizards interface with the user through a series of "pages." The user "navigates" through these pages to input and view data. Window 301 is the main Publisher window. Window 302 is the main PageWizard window, which overlays window 301. Window 302 comprises page-specific controls 303, a graphic item 304, and main navigation controls 305. The main navigation controls 305 allow the user to select the various pages that the Calendar PageWizard provides. The "Next >" control 306 indicates to go to the next page. The "<" control 307 indicates to go to the previous page. The "| < <" control 309 indicates to exit the Calendar PageWizard and return to the Publisher.

The pages are defined in a page resource file with user-defined resources. For each page, the resource file contains the following information:

```
PAGEn      PAGE
           BEGIN NextPageNum, cControls,
           control information,
           control information,
           control information,
           . . .
           END
``` where n in PAGEn specifies the page number, NextPageNum specifies the page to be displayed when the next page is selected, and cControls is the count of the control information lines that follow. The format of the control information lines is controltype, test, id, x, y, width, height, nextpage where the format is same as the standard dialog controls except for the item nextpage. The item nextpage specifies the next page to go to when the control is selected. This allows the navigation sequence of the pages to vary based on the control the user selects.

The graphics for the pages are defined in a resource file with user-defined resource items. There are two types of graphic items: a metafile and a text object. Each graphic item has an entry in the graphics resource file. The format for the metafile entry is

```
GRNAME   METAFILE   grname.wmf
GRNAME   BOUNDS
         BEGIN
```

-continued

```
         x, y, width, height
    END
``` where grname.wmf specifies the name of the associated metafile (each metafile is stored in a separate file) and variables x, y, width, and height specify the positioning of the metafile on the page. The format for a text object entry is

```
TXNAME  TEXTOBJECT
        BEGIN
          stringID, x, y, width, height,
          fontname, ptsize, fontstyle,
          R1, G1, B1, R2, G2, B2,
          fBorder, leftindent, rightident, align
        END
``` where stringID contains the id of a string that is stored in a string resource file. The string resource file contains stringID and the associated text string. The other variables define the position and display characteristics of the string.

Figure 4:
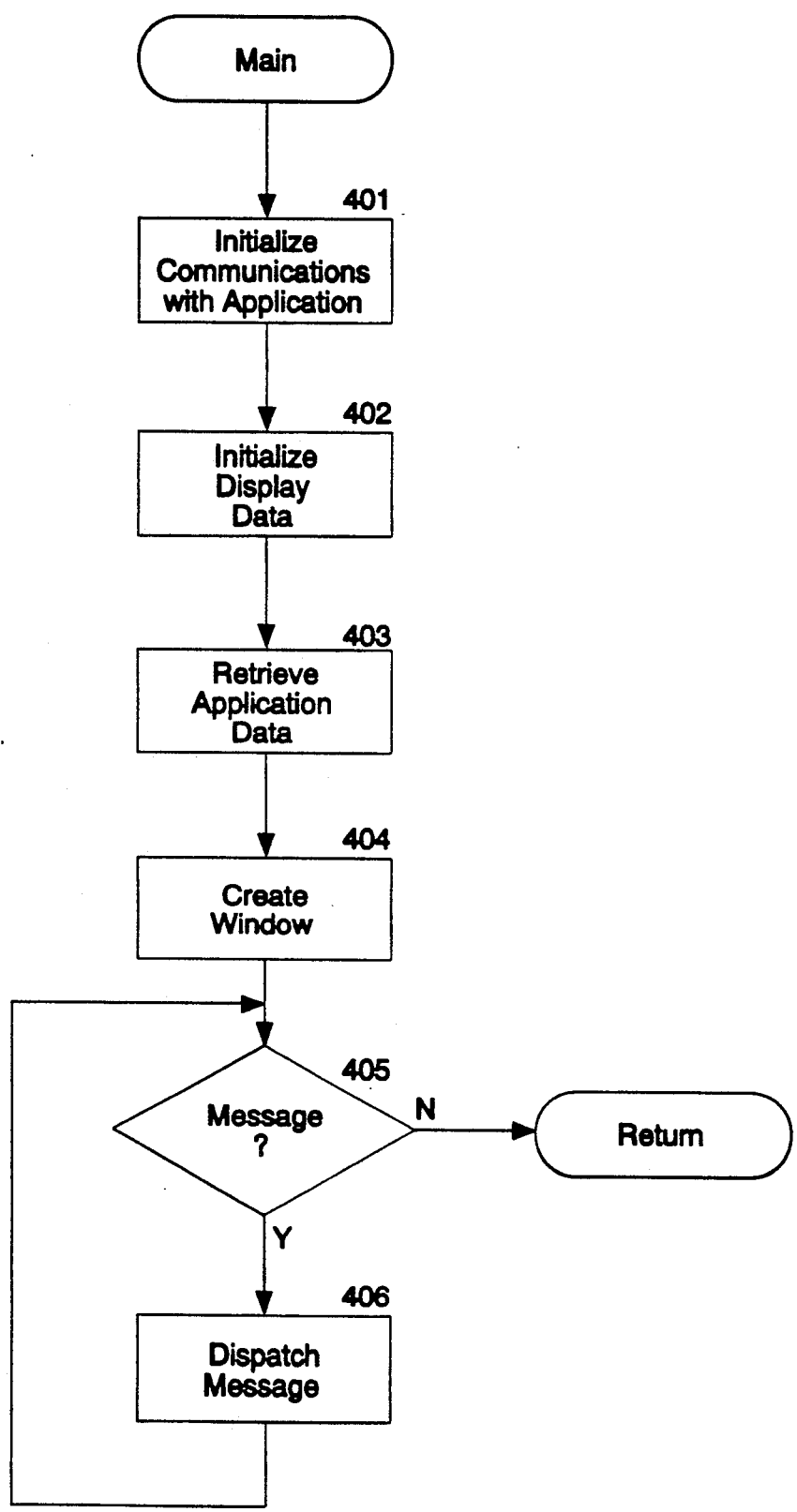
FIG. 4 is a flow diagram of the message processing for a PageWizards.

In a preferred embodiment, all wizards that interact with a certain application program share common architectural features. For example, all wizards that interface with the Publisher use pages as described above. A PageWizard has a main window procedure and a window procedure for each page. The main window procedure sends messages to the pages to control the navigation through the pages. FIG. 4 is a flow diagram of the main window procedure for a PageWizards. In block 401, the procedure opens the communications channel with the application program. In another embodiment, the communications channel is opened just before the first communications data is sent. In block 402, the procedure initializes an internal data structure with display information from the resource files. In block 403, the procedure requests and receives status information from the application program. In block 404, the procedure creates the main window. In blocks 405 and 406, the procedure executes the main message loop. The procedure waits for a message and then dispatches the message.

Figure 5:
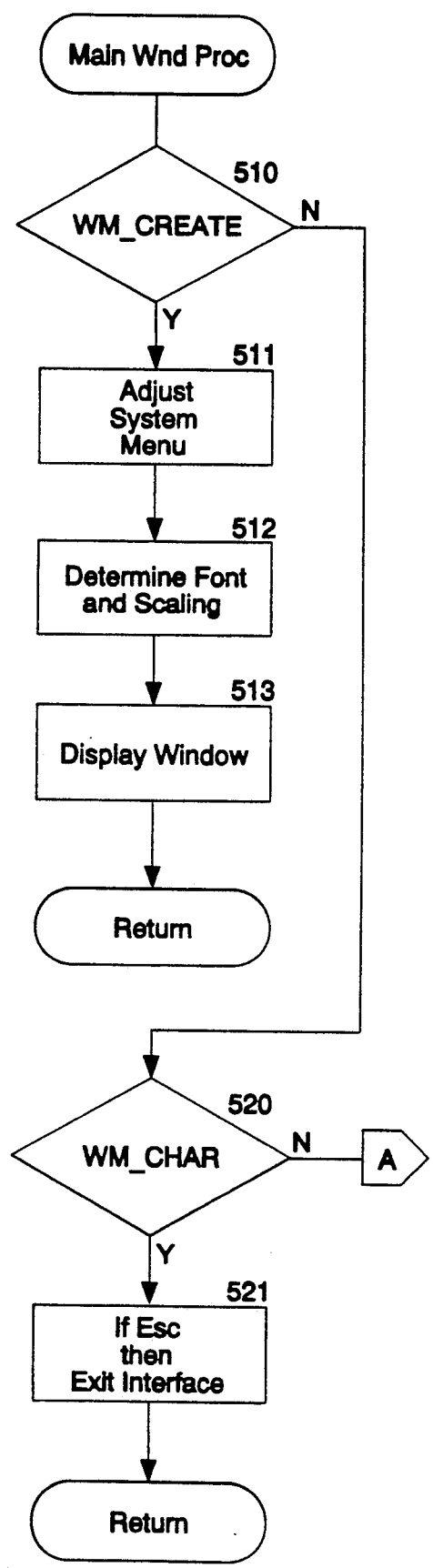
FIG. 5 is a flow diagram of the message processing procedure for the PageWizard main window.
Figure 5:
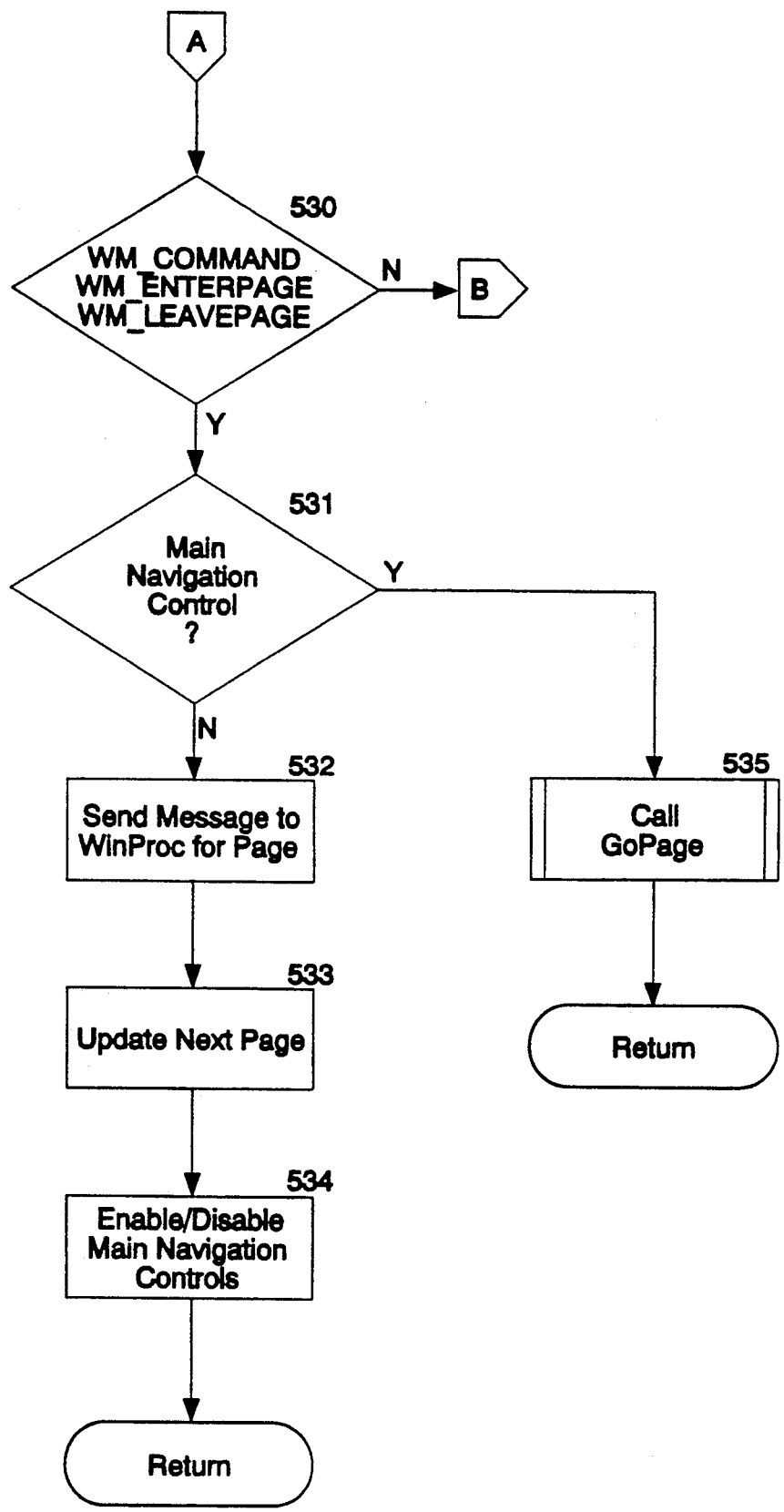
Figure 5:
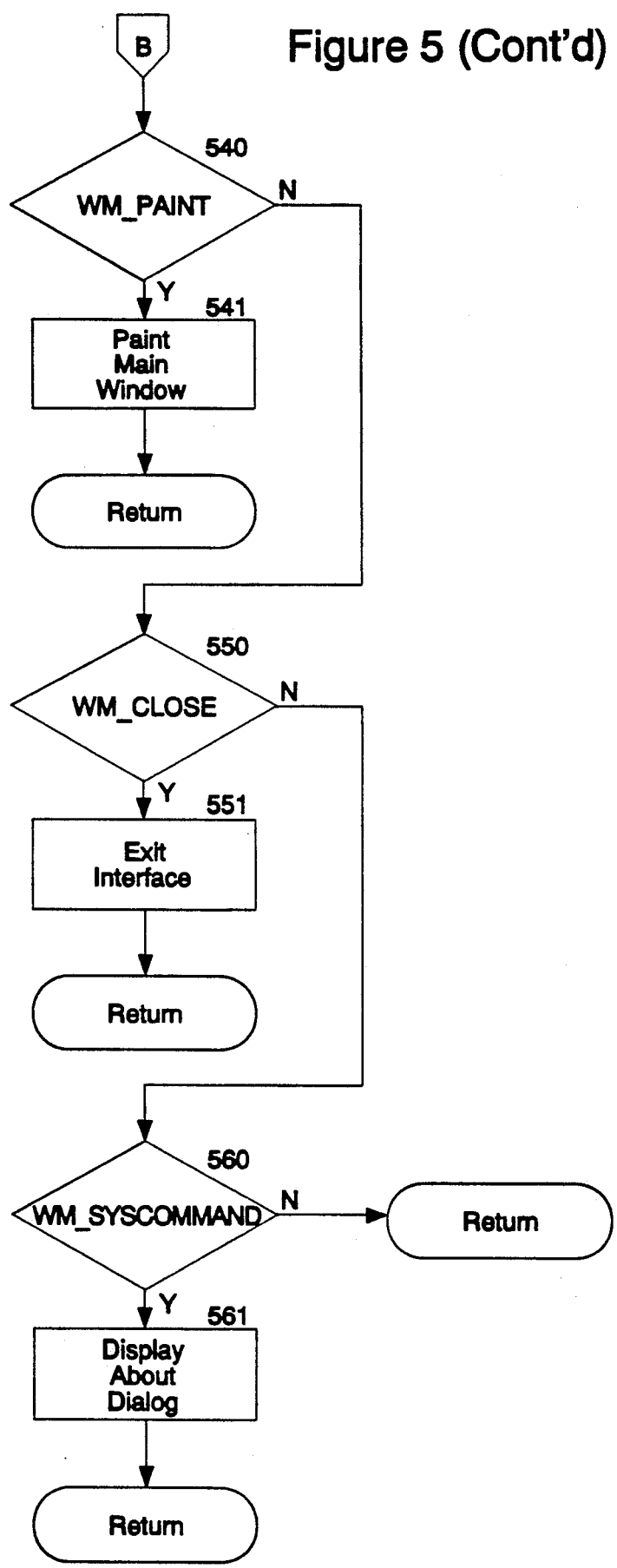

FIG. 5 is a flow diagram of the main window procedure for the PageWizard. This procedure displays the main window, processes the termination character, controls the navigation through the pages, and handles other miscellaneous windowing functions. Blocks 510, 520, 530, 540, 550, and 560 decode the message. In block 510, if the message is a WM_CREATE, then the procedure displays the main window in block 511 through 513. In block 511, the procedure adjusts the system menu by removing non-applicable menu commands and adding an "Abort . . . " menu command. In block 512, the system determines the appropriate font based on the video configuration, and then scales the size of the main PageWizard window based on the size of this font. In block 513, the procedure displays the main window and returns. In block 520, if the message is WM_CHAR, then the procedure continues at block 521. In block 521, if the WM_CHAR message indicates that the escape key was pressed, then the procedure effects the exiting of the PageWizard. In block 530, if the message is a WM_COMMAND, a WM_ENTERPAGE, or a WM_LEAVEPAGE message, then the procedure continues at block 531. In block 531, if the message is for a main navigation control, then the procedure continues at block 535, else the procedure continues at block 532. In block 532, the procedure passes the message to the window procedure for the page currently displayed. Each page has a corresponding window procedure to handle the message for that page. In block 533, the procedure updates a variable to track the current page. In block 534, the procedure enables or disables the navigation controls to reflect whether there is no next page or no previous page and returns. In block 535, the procedure calls procedure GoPage (described below), which effects the switching of pages and returns. In block 540, if the message is WM_PAINT, then the procedure continues at block 541. In block 541, the procedure paints the main PageWizard window and returns. In block 550, if the message is WM_CLOSE, then the procedure continues at block 551. In block 551, the procedure exits the PageWizard. In block 560, if the message is WM_SYSCOMMAND, then the procedure continues at block 561. In block 561, the procedure displays the about dialog box and returns.

Figure 6:
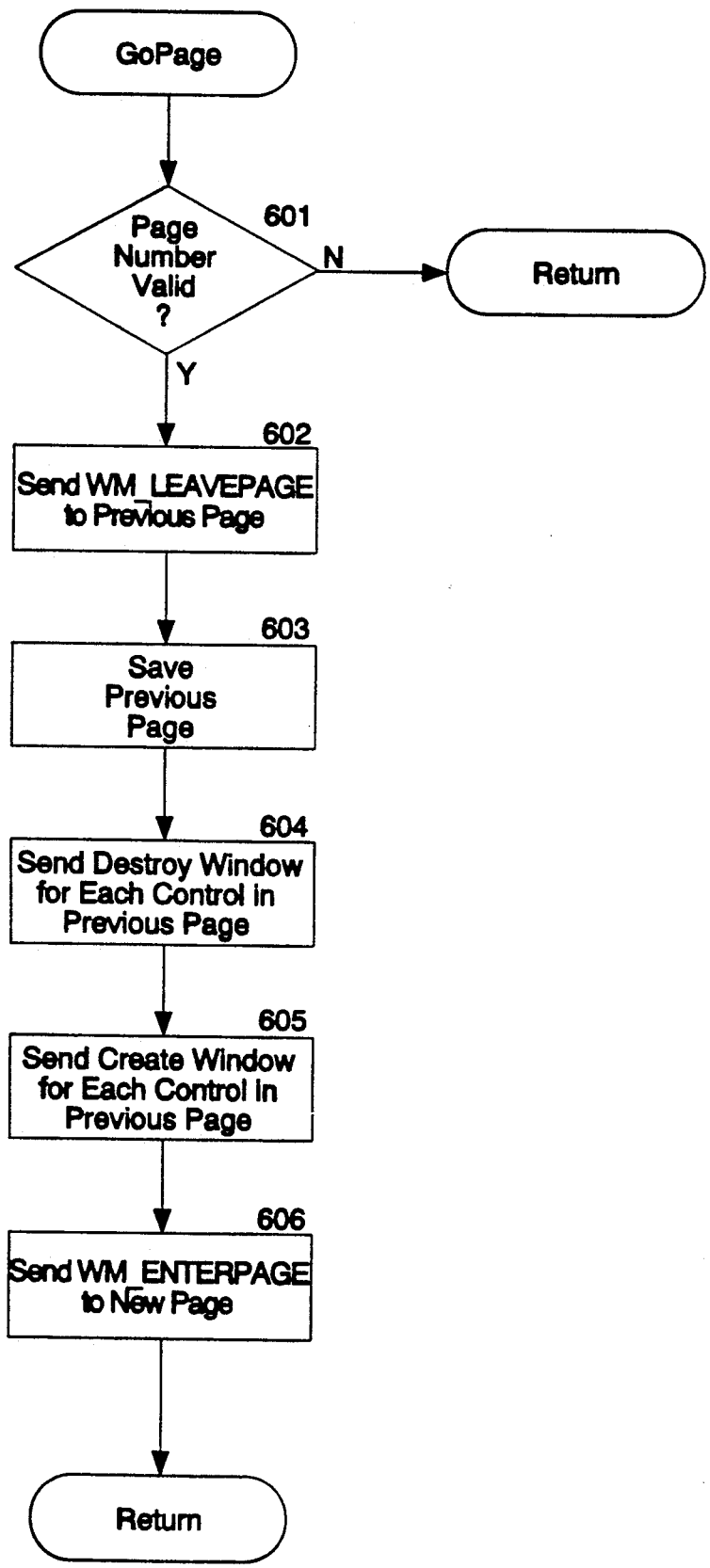
FIG. 6 is a flow diagram of the procedure GoPage.

FIG. 6 is a flow diagram of the procedure GoPage. This procedure receives a page number and effects the changing from the current page to the received page. In block 601, if the received page number is valid, then the procedure continues at block 602, else the procedure returns. A page number is valid if it is defined in the page resource file. In block 602, the procedure sends a WM_LEAVEPAGE message to the previous page. In block 603, the procedure saves the previous page in a list of previous pages. This list is used to navigate through previous pages. In block 604, the procedure destroys the controls of the previous page. In block 605, the procedure creates the controls for the new page. In block 606, the procedure sends a WM_ENTERPAGE message to the window procedure for the new page.

Figure 7:
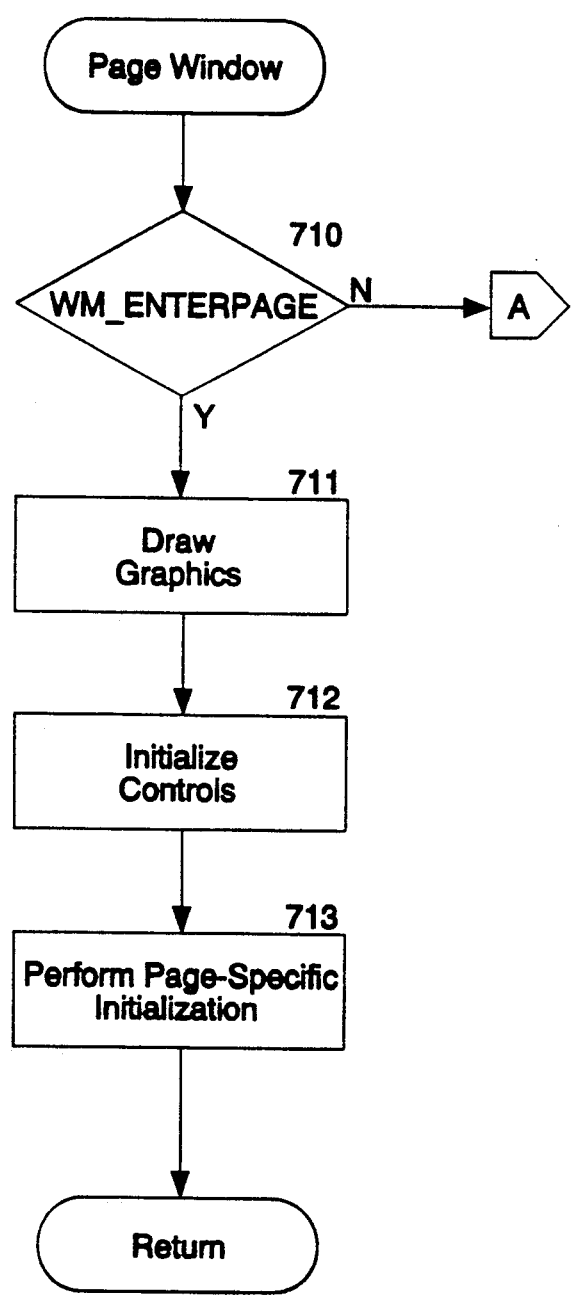
FIG. 7 is a flow diagram of a preferred window procedure for a page.
Figure 7:
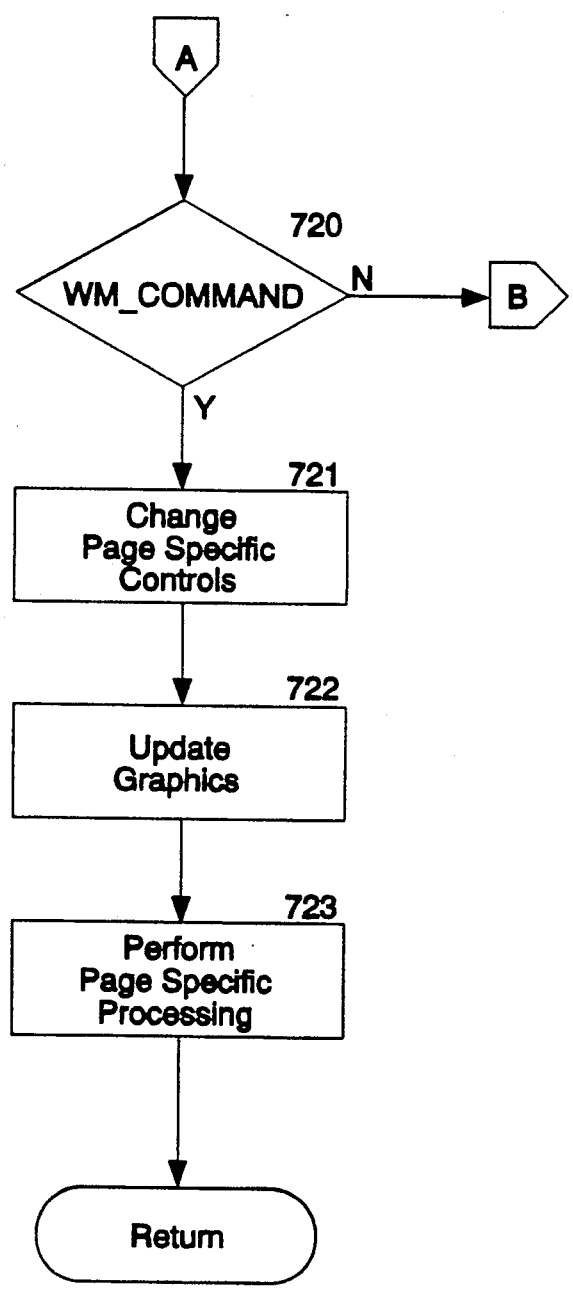
Figure 7:
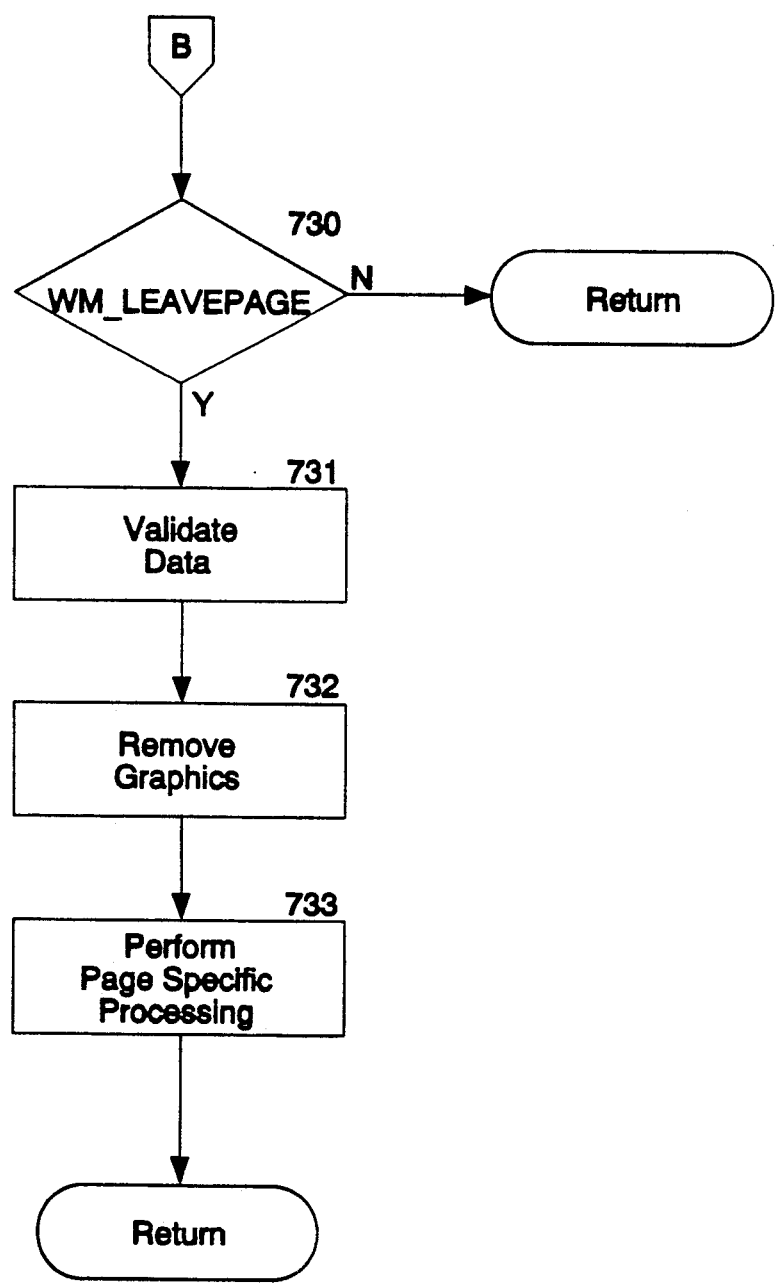

FIG. 7 is a flow diagram of a preferred window procedure for a page. In a preferred embodiment, the page windows are architecturally similar in the way they handle navigation controls. In block 710, if the message is WM_ENTERPAGE, then the procedure continues at block 711. The WM_ENTERPAGE message is sent from the procedure GoPage. In block 711, the procedure draws the graphics objects for the page. In block 712, the procedure initializes the controls. In block 713, the procedure perform page-specific initialization and returns. In block 720, if the message is WM_COMMAND, then the procedure continues at block 721. The WM_COMMAND message is sent from the procedure GoPage. In block 721, the procedure updates page-specific controls. In block 722, the procedure updates page-specific graphics. In block 723, the procedure performs page-specific processing and return. In block 730, if the message is WM_LEAVEPAGE, then the procedure continues at block 731. The WM_LEAVEPAGE message is sent by the procedure GoPage. In block 731, the procedure validates the user-entered page data. In block 732, the procedure removes page-specific graphics from the display. In block 733, the procedure performs page-specific processing and returns.

In a preferred embodiment, the application interface portion of the interface program controls the gathering of status information from the application program, the creating of task commands, and the sending of the task commands to the application program. The application interface code creates the task commands based on the user-entered information and status information supplied by the application program. For Calendar PageWizards, the application interface generates task commands to create a calendar in the Publisher based on the user data and designs built into Calendar PageWizards. The user data specifies size, font, date, arrangement, and other options for calendar creation.

In a preferred embodiment, the application interface communicates with the application program through the dynamic data exchange (DDE) facilities of Windows. The interface program functions as a DDE client to the application program, which functions as a DDE server. The interface program initiates a conversation with the application program by sending a DDE_INITIATE message specifying the application and topic. The application program responds with a DDE_ACK message. To request status information, the interface program sends a DDE_REQUEST message with the item to the application program. The application program responds with a DDE_DATA message with the requested item. The interface program sends a request for each item it needs from the application program. The interface program sends commands to the application program by sending a DDE_EXECUTE message with the command to the application. The application program returns a DDE_ACK message when it completes processing the command. If the interface program interacts with multiple application programs, then this communications occurs with each application program.

Figure 8:
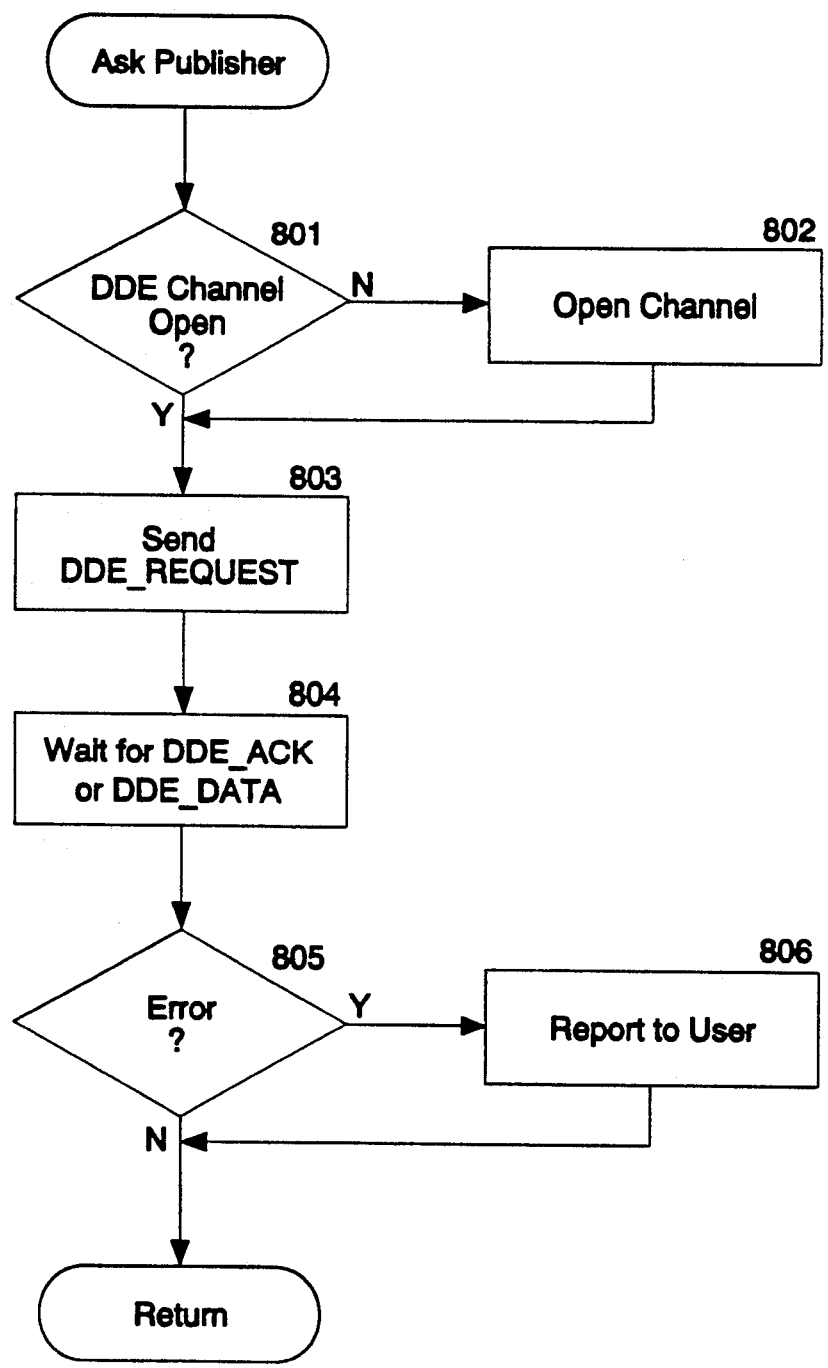
FIG. 8 is a flow diagram of the AskPublisher procedure.
Figure 9:
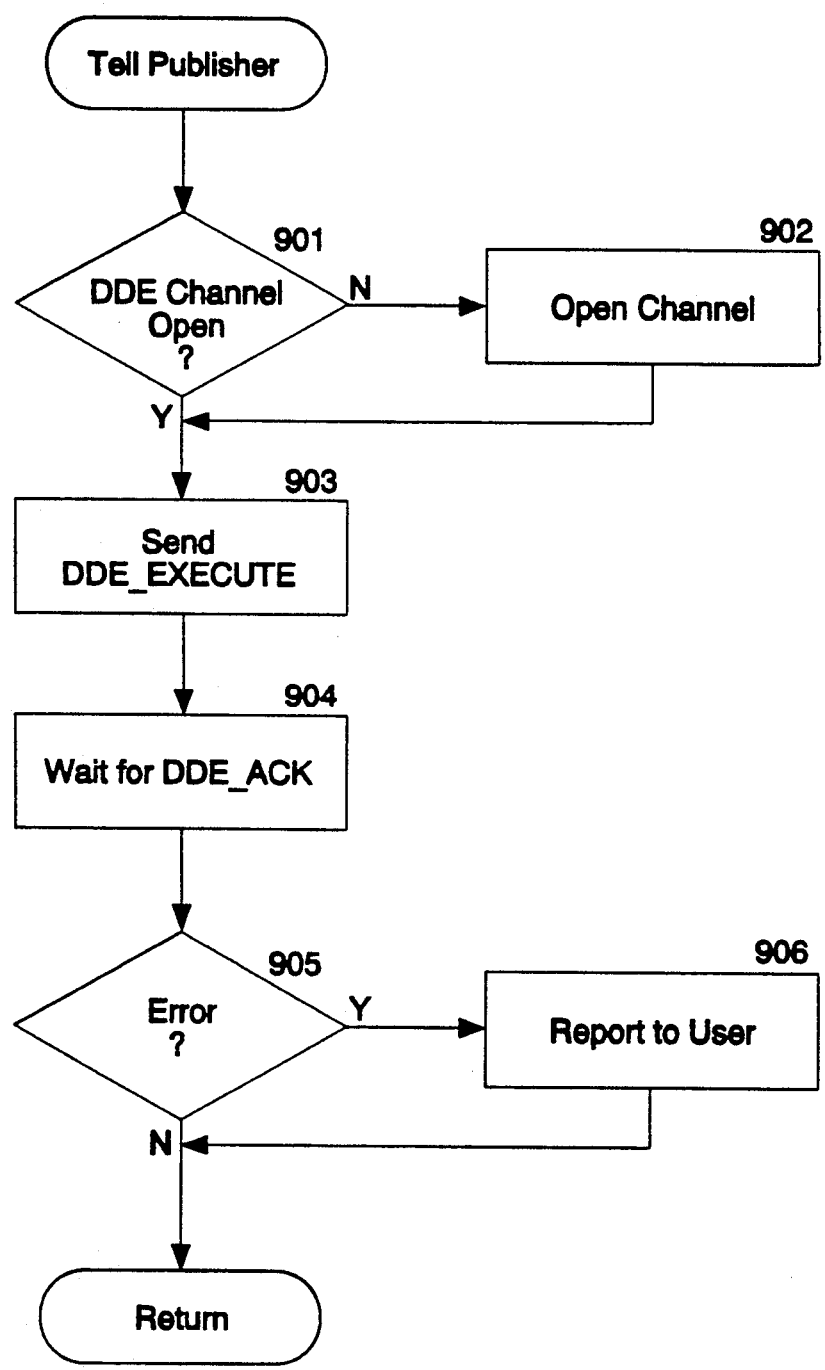
FIG. 9 is a flow diagram of the TellPublisher procedure.

FIGS. 8 and 9 show flow diagram of procedures that support the DDE communications in PageWizards. FIG. 8 is a flow diagram of the AskPublisher procedure. The AskPublisher procedure opens the DDE channel if not already open and requests status information from the Publisher. This procedure receives an input parameter the item to request from the Publisher. In block 801, if the DDE channel is not open, then the procedure opens the channel in block 802 (as described above) and continues at block 803. In block 803, the procedure sends a DDE_REQUEST message with the item to the Publisher. In block 804, the procedure waits for a DDE_DATA or DDE_ACK message to be received from the Publisher. This waiting ensures that Publisher will process the request before AskPublisher returns to the invoking routine. In block 805, if the DDE_ACK message indicates an error, then the procedure reports the status to the user in block 806. The procedure then returns.

FIG. 9 is a flow diagram of the TellPublisher procedure. The TellPublisher procedure opens the DDE channel if not already open and sends commands to execute to the Publisher. This procedure receives as input parameter the command to send to the Publisher. In block 901, if the DDE channel is not open, then the procedure opens the channel in block 902 (as described above) and continues at block 903. In block 903, the procedure sends a DDE_EXECUTE message with the item to the Publisher. In block 904, the procedure waits for the DDE_ACK message to be received from the Publisher. This waiting ensures that Publisher will process the command before TellPublisher returns. In block 905, if the DDE_ACK message indicates an error, then the procedure reports the status to the user in block 906 and returns.

Although the methods and systems of the present invention have been disclosed and described with respect to preferred embodiment, it is not intended that the present invention be limited to such embodiments. Rather, the present invention is intended to include all legally equivalent embodiments. Modifications within the spirit of the invention will be apparent to those skilled in the art. The scope of the present invention is defined by the claims that follow.

What is claimed is:

1. A method in a computer system for performing a desired task in an application computer program, the application computer program having a plurality of functions, the functions for performing tasks, the application computer program having commands, the commands for controlling execution of the functions, the method comprising the steps of:

executing the application computer program wherein the application computer program starts execution of an interface computer program that executes concurrently with the execution of the application computer program;

generating status commands in the interface computer program, the status commands for requesting that status information for the application computer program be sent from the application computer program to the interface computer program;

sending the status commands from the interface computer program to the application computer program;

processing the status commands in the application computer program and sending status information from the application computer program to the interface computer program;

receiving in the interface computer program the status information sent from the application computer program to the interface computer program;

inputting in the interface computer program user requests from a user of the interface computer program to perform the desired task;

generating task commands in the interface computer program to implement the desired task based on the status information and the user request;

sending the task commands from the interface computer program to the application computer program; and executing the task commands in the application computer program to effect the performing of the desired task.

2. The method of claim 1 wherein the steps of sending the status commands, receiving the status information, and sending the task commands use a dynamic data exchange.

3. The method of claim 1 wherein the application program has a predefined user interface and interface computer program provides a specialized user interface adapted to the performing of the desired task.

4. The method of claim 1 wherein the interface program and the application program execute in a windowing environment.

5. A method in a computer system for controlling execution of a computer program to effect the performing of a specialized task, the computer program having an interprocess communications interface, the computer program having commands to control the performance of tasks, the method comprising the steps of:

starting the execution of the computer program, wherein the computer program starts execution of an interface computer program; and during execution of the interface computer program, gathering status information from the computer program through the interprocess communications interface;

collecting user input relating to the task to be completed;

generating interprocess communications commands to effect the performance of the specialized task based on the status information and user input; and sending the generated commands to the computer program through the interprocess communications interface to effect the controlling of the execution of the computer program.

6. The method of claim 5 wherein the interprocess communications interface is the dynamic data exchange.

7. The method of claim 5 wherein the computer program and the interface computer program execute as separate processes on the computer system.

8. A method in a computer system for controlling execution of an application computer program by an interface computer program to effect performance of a specialized task, the application computer program having commands to specify performance of tasks, the method comprising the step of:

starting execution of the application computer program;

under control of the application computer program, starting execution of the interface computer program;

under control of the interface computer program,
collecting user input relating to the specialized task to be performed;
receiving status information from the application computer program;
selecting commands to effect the performance of the specialized task by the application computer program based on the collected user input and the received status information; and
sending the selected commands to the application computer program; and under control of the application computer program, receiving the selected commands; and
performing tasks specified by the received commands to effect performance of the specialized task.

9. The method of claim 8 including the steps of: under the control of the interface computer program, sending a request for status information to the application computer program; and
under control of the application computer program, receiving the request for status information; and sending the requested status information to the interface computer program.

10. The method of claim 8 including the steps of: under control of the interface computer program,
receiving an indication from a user to stop execution; and
stopping execution of the interface computer program.

11. The method of claim 8, 9, or 10 wherein the computer system is a multi-processing computer system for executing computer programs as separate processes and wherein the application computer program and the interface computer program execute as separate processes.

12. A method in a computer system for providing a plurality of alternate user interfaces to an application computer program, the application computer program having a primary user interface, each alternate user interface being implemented by an interface computer program, the method comprising the steps of:

starting execution of the application computer program;

under control of the application computer program, selecting an alternate user interface; and
starting execution of the interface computer program that implements the selected alternate user interface;

under the control of the executing interface computer program;
displaying data of the alternate user interface;
inputting a specification of a function to be performed by the application computer program;
receiving status information from the application computer program;
selecting commands of the application computer program to effect the performance of the function based on the received status information; and
sending the selected commands to the application computer program;

under control of the application computer program, receiving the selected commands; and
executing the received commands to effect performance of the function.

13. The method of claim 12 including the steps of:
under the control of the interface computer program, sending a request for status information to the application computer program; and
under control of the application computer program, receiving the request for status information; and
sending the requested status information to the interface computer program.

14. The method of claim 12 including the steps of:
under control of the interface computer program,
receiving an indication from a user to stop execution; and
stopping execution of the interface computer program.

15. The method of claim 12, 13, or 14 wherein the computer system is a multi-tasking computer system for executing computer programs as separate tasks and wherein the application computer program and the interface computer program execute as separate tasks.

16. A method in a computer system for performing a task by an application program, the application program having a plurality of low-level commands, each low-level command for performing a portion of the task, the method including the steps of:

starting execution of the application program, wherein the application program starts execution of an interface program, the interface program having a high-level command that specifies the task;

under control of the interface program,
receiving an indication of the high-level command from a user;
receiving status information from the application program;
selecting low-level commands to effect the performance of the task specified by the high-level command based on the received status information; and
sending the selected low-level commands to the application program; and under control of the application program,
receiving the selected low-level commands; and
performing the received low-level commands to effect the performance of the task.

17. The method of claim 16 including the steps of:
under control of the interface program,
receiving a request to stop execution of the interface program; and
in response to receiving the request to stop execution, stopping execution of the interface program.

18. The method of claim 16 or 17 wherein the computer system is a multi-processing computer system and wherein the starting of execution of the interface program includes the step of specifying that the interface program executes in a separate process from the application program.

19. A method in a computer system for providing a plurality of alternate user interfaces for an application computer program, the application computer program having a primary user interface, each alternate user interface being implemented by an interface routine, the method comprising the steps of:
starting execution of the application computer program;
under control of the application computer program,
selecting an alternate user interface; and
invoking an interface routine that implements the selected alternate user interface;
under the control of the invoked interface routine,
displaying data of the alternate user interface;
inputting a specification of a task to be performed by the application computer program;
gathering status information about the application computer program;
selecting commands of the application computer program to effect the performance of the task based on the gathered status information; and
returning the selected commands to the application computer program; and
under control of the application computer program, performing tasks associated with the returned commands.

20. The method of claim 19 including the steps of:
under the control of the interface routine, sending a request for status information to the application computer program; and
under control of the application computer program,
receiving the request for status information; and
sending the requested status information to the interface routine.

21. The method of claim 19 including the steps of:
under control of the invoked interface routine,
receiving an indication from a user to stop execution; and
returning from the invocation of the interface routine.

* * * * *